Nov. 23, 1954  L. W. BOERNER  2,695,069
FIRE EXTINGUISHING FOAM TUBE
Filed Feb. 7, 1951
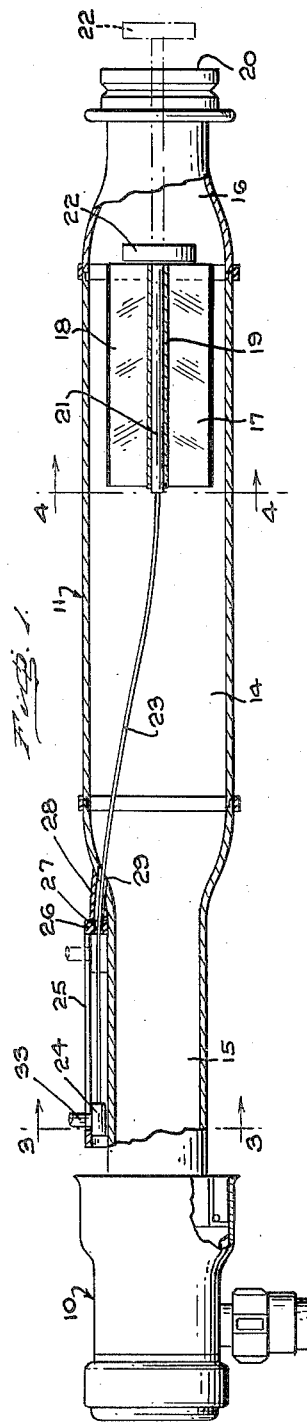
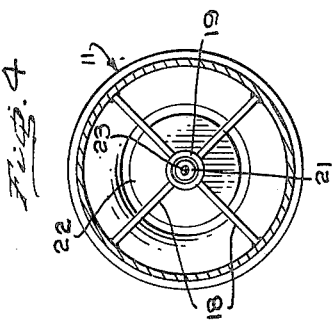
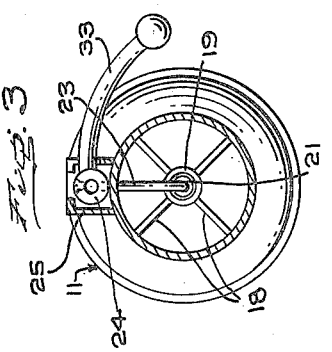
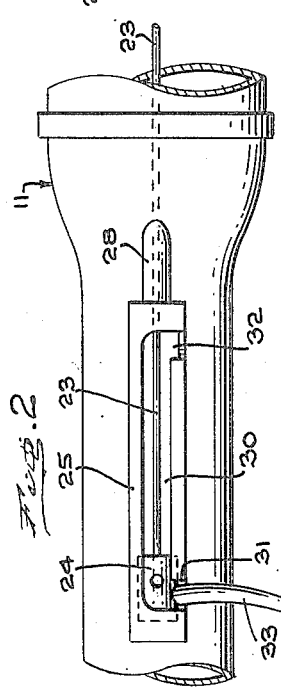
INVENTOR
LEWIS W. BOERNER
BY *Lew Edelson*
ATTORNEY

United States Patent Office 2,695,069
Patented Nov. 23, 1954

2,695,069

FIRE EXTINGUISHING FOAM TUBE

Lewis W. Boerner, West Chester, Pa., assignor to National Foam System, Inc., West Chester, Pa.

Application February 7, 1951, Serial No. 209,885

11 Claims. (Cl. 169—1)

This invention relates generally to apparatus for producing fire-extinguishing foam and more particularly to improvements in the design and construction of means for regulating and controlling the pattern and character of the foam stream delivered by the foam-producing apparatus.

As is now well known in the art, mechanical foam is generally produced by delivering water to a discharger head wherein and by which the water is finally subdivided and comingled with a foam-forming liquid immediately prior to entrainment of air therewith, the subdivided stream with the air entrained therein being directed into and through a tube for discharge in the form of a foam stream. Or, the water previously charged with the foam-forming liquid may be delivered to the discharger head for subdivision and entrainment of air just prior to its delivery into and through the foam discharge tube. A satisfactory type of such tube, in which the foam is formed and which is employed to direct the foam to the fire to be extinguished, is that which is shown and described in United States Letters Patent No. 2,478,998 of August 16, 1949.

It is among the principal objects of the present invention to provide the foam tube with manually operable means for regulating and controlling the pattern of the foam stream which is discharged from the tube, said means being readily operable at the will and under the control of the operator of the foam producer to vary the character of the foam stream from that of one in the form of a substantially solid stream of high velocity and relatively long trajectory for application of the foam over a localized area relatively distant from the tube to one in the form of a widely diffused spray which is particularly effective to blanket with foam an extensive area close to and in the immediate region of the discharge end of the tube.

A further and important object of the present invention is to provide a foam discharge tube of the character aforesaid with a foam spreader element located at the foam delivery end of the tube which is so positionally adjustable axially of the tube as to instantly convert the foam stream from that of a high velocity, long trajectory stream into one of low velocity and such wide spread as to render the foam ideally suited for the extinguishment of spill fires and the like which generally require the foam to be flowed gently over the fire, as well as for the extinguishment of fires where no "backboard" is available against which to splash a high velocity foam stream. Of course, the conversion of the foam stream may also be in the opposite direction from that described to instantly provide, as needed, a high velocity, substantially solid foam stream for projection of the foam over an area at a substantial distance from the foam tube.

Still other objects of the present invention are to provide a simple and effective control means upon the foam discharge tube which is conveniently located for easy manual operation by the operator of the foam producer to vary the cooperative position of the foam spreader element; to provide a means for regulating the foam stream discharge without impairing the volume and quality of the discharged foam for any adjusted position of the spreader element; and to provide actuating means which are operative to lock the spreader element in either of its extreme positions of adjustment relatively to the foam discharge end of the foam tube.

Other objects and advantages of the invention will appear more fully hereinafter, it being understood that the present invention consists substantially in the combination, construction, location and relative arrangement of parts, all as described in detail hereinafter, as shown in the accompanying drawings and as finally pointed out in the appended claims.

In the accompanying drawings:

Figure 1 is a longitudinal view, partially in cross-section, showing a preferred construction of the apparatus of the present invention;

Figure 2 is a side elevational view of a portion of the apparatus shown in Figure 1;

Figure 3 is a transverse sectional view as taken on the line 3—3 of Figure 1; and Figure 4 is a transverse sectional view as taken on the line 4—4 of Figure 1.

Referring now to the drawings and more particularly to Figure 1 thereof, it will be noted that the foam-producing apparatus of the present invention essentially consists of a liquid discharger unit designated 10 which may be of any desired construction, as, for example, that shown and described in United States Letters Patent No. 2,512,456, of June 20, 1950. As is well understood in the art to which the present invention relates, the rear end of the discharger unit 10 is adapted to be connected to a conduit (not shown) through which water, under suitable pressure, is supplied to the unit for mixture with a suitable foam-forming material and air to form foam, the foam being discharged by way of a foam discharge tube 11 for application to the fire to be extinguished.

While in the form of the apparatus illustrated in the drawing, the foam-forming material, derived from a suitable source of supply by way of a pick-up 13, is introduced as a liquid into the water stream by suction induced within the unit by the water passing therethrough, it will be understood that the unit 10 is equally adapted for use in connection with so-called premixed foam-forming solutions, in which case the foam-forming material is preliminarily introduced into the water stream at a point in the water supply line ahead of the unit to form a suitable foam-forming solution which is delivered to the discharger unit under sufficient pressure to effect its discharge therefrom in the form of a high velocity stream or jet. In either case, as the form-forming solution so discharged from the unit 10 is introduced into the foam discharge tube 11, air from atmosphere is entrained into the stream of the solution so that foam is formed within the tube.

While the foam discharge tube illustrated in the drawing is preferably of the design and construction shown and described in United States Letters Patent No. 2,478,998, of August 16, 1949, it may be of any other construction adapted to project the foam in the form of a relatively high velocity stream for application of the foam over a localized area at a considerable distance from the discharge tube.

It will be noted that the foam discharge tube 11 is provided with an enlarged intermediate section 14 and with an inlet section 15 and a foam discharge section 16, each of which latter sections are of reduced diameter to provide them with effective cross-sectional areas substantially less than that of the intermediate section 14 of the tube, in consequence of which the foam stream is streamlined in its flow through the tube and is discharged therefrom with a velocity approximately equal to that of the stream entering the tube. The result is that the foam stream issues from the tube in the form of a relatively high velocity, solid stream capable of being projected over a considerable distance for application of the foam to a localized area or spot.

Fitted within the interior of the enlarged intermediate section 14 of the foam discharge tube is a "stream straightener" unit 17 consisting of a plurality of radially extending members 18, the inner edges of which are commonly secured to an elongated tubular element 19 disposed centrally within the tube 11 with its longitudinal axis in axial coincidence with that of the tube. The outer edges of the members 18 are each suitably secured to the internal wall of the tube 11, it being thus apparent that while the said radially extending members 18 conjointly serve to support the tubular element 19 centered within the foam tube, they permit free streamlined flow of the foam stream through the tube for discharge of the foam from the open discharge end 20 thereof.

Slidably fitted within the tubular element 19 of the stream straightener unit is a rod 21 to the outer end of which is suitably affixed a foam spreader 22 in the form of a circular disk of a diameter somewhat less than the effective diameter of the open discharge end 20 of the tube 11 and substantially less than the effective internal diameter of the intermediate enlarged section 14 of the tube. The diameter of the foam spreader 22 is such that when it is in its full line position, as shown in Figure 1, it does not interfere with the free flow of the foam stream through the tube and does not appreciably alter the normal form and character of the foam stream issuing from the tube.

Secured to the inner end of the axially slidable rod 21 is a flexible wire thrust member 23 which extends rearwardly through the tube 11 for attachment to an actuating bolt 24 which is slidably disposed within an elongated guide 25 suitably mounted upon the inlet section or tail piece 15 of the foam tube. This guide 25, which is brazed or otherwise fixedly attached to the tube, is provided at its forward end with an end closure 26 having an opening 27 in registry with the bore of a guide sleeve 28 for the wire thrust member, which latter passes into and through the guide sleeve by way of a small registering opening 29 formed in the wall of the foam tube. The guide sleeve 28 is brazed or otherwise fixedly secured to the foam tube as an extension of the bolt guide 25, or it may be formed as an integral part of the latter.

The guide 25 for the actuating bolt is provided along the top side thereof with an elongated slot 30 the opposite ends of which are laterally notched as at 31—32. The actuating bolt 24 is itself provided with a laterally extending handle part 33 by means of which the bolt may be rotated about its axis to aline the handle with the slot 30 for longitudinal sliding of the bolt lengthwise of its guide 25, this handle part being adapted to seal in one or the other of the notches 31—32 to lock the bolt in either of the two positions respectively indicated by the full and dotted line positions shown in Figure 1.

It will be noted that when the bolt 24 is rearwardly retracted into its full line position shown in Figures 1 and 2, the foam spreader disk 22 is drawn well into the foam tube and so affords no appreciable impediment or obstruction to full and free flow of the foam stream through the tube for delivery from its discharge end in the form of a relatively high velocity more or less solid stream capable of being projected to a localized area or spot considerably distant from the foam discharge tube.

When, however, the bolt 24 is shifted forwardly in its guide into its dotted line position shown in Figure 1, the spreader disk 22, through the intervention of the wire thrust member 23, is shifted axially of the foam tube into a position external of its discharge end, as shown by dotted lines in Figure 1. In this latter adjusted position of the foam spreader, it serves as a baffle or deflector for the foam stream issuing from the foam tube and disperses the stream into a more or less finely diffused spray or fully formed foam the quality of which is comparable with that of the solid stream projected from the tube when the spreader disk is in its fully retracted position. The pattern of the foam spray produced by the spreader disk when in its forwardly adjusted position is that of a cone which discharges over a distance approximately half that of the solid stream and provides a ground coverage of foam over an area roughly in the form of a circle of considerably greater diameter than that afforded by the solid stream of foam. This pattern of projected foam is extremely valuable when fighting fires where no "backboard" is available against which to splash the foam so as to cause it to flow gently over the fire, as in the case of spill fires.

An important feature and advantage of the present construction is that the operator of the apparatus may instantly convert the foam stream from that of a high velocity, solid stream having a relatively long trajectory to that of diffused cone of wide spread and relatively short trajectory, and vice versa, without the necessity of shutting off the water and/or foam-forming liquid supply to the foam discharger. Also, by the simple expedient of rotating the shank of the handle part of the actuating bolt into one or the other of the notches 31—32, the spreader disk 22 is instantly locked securely in either of its two operative positions selected by the operator, there being no necessity on the part of the latter to employ any special tools or devices for effecting the desired positional adjustment of the spreader disk.

It will be understood, of course, that the present invention is susceptible of various changes and modifications which may be made from time to time without departing from the real spirit or general principles thereof, and it is accordingly intended to claim the same broadly, as well as specifically, as indicated by the appended claims.

What is claimed as new and useful is:

1. In an apparatus for producing fire-extinguishing foam, a cylindrical tube for receiving the foam and discharging the same in the form of a substantially solid stream, said tube having a main foam conveying section and an adjoining foam discharge section through which to effect discharge of the foam from the tube at relatively high velocity, and a circular deflector plate of a diameter less than that of said foam discharge section, said deflector plate being carried directly by and being normally disposed within said main section of the tube and being shiftable axially through said discharge section for disposition axially in advance of said discharge section to intercept and laterally disperse the foam issuing from the tube, and means manually shiftable fore and aft from without said tube, said means being operatively connected with said deflector plate for corresponding movement thereof through said discharge section as aforesaid and being shiftable as aforesaid by a substantially straight line pull or push.

2. In an apparatus for producing fire-extinguishing foam, a cylindrical tube for receiving the foam and discharging the same in the form of a substantially solid stream, said tube having a main foam conveying section and an adjoining foam discharge section of reduced cross-sectional area to effect discharge of the foam from the tube at relatively high velocity, and a circular deflector plate of a diameter less than that of said discharge section, said deflector plate being carried directly by and being normally disposed centrally within said main section of the tube and being shiftable axially through said discharge section for disposition axially in advance of said discharge section to intercept and laterally disperse the foam issuing from the tube, and means accessible from without said tube and shiftable fore and aft by a staright line pull or push, said means being connected with said deflector plate for effecting simultaneous shifting movement thereof axially of said discharge section as aforesaid.

3. In an apparatus for producing fire-extinguishing foam, a cylindrical tube for receiving the foam and discharging the same in the form of a substantially solid stream, said tube having a main foam conveying section and an adjoining foam discharge section to effect discharge of the foam from the tube at relatively high velocity, and a circular deflector plate of a diameter less than that of said foam discharge section, said deflector plate being normally disposed within said main section of the tube and being shiftable axially through said discharge section for disposition axially in advance of said discharge section to intercept and laterally disperse the foam issuing from the tube, and thrust means manually operable from without said tube and operatively connected through the wall of said tube to said deflector plate for axially shifting the latter into one or the other of the portions aforesaid.

4. In an apparatus for producing fire-extinguishing foam, a cylindrical tube for receiving the foam and for discharging the same in the form of a substantially solid stream, an axially shiftable deflector disk carried by said tube, said disk having a stem extending axially of the tube, a tubular guide for said stem disposed centrally within the tube, and thrust means manually operable from without said tube and operatively connected to said stem for effecting axial shifting thereof within its tubular guide whereby to selectively position said disk either within said tube or externally of the tube in advance of its foam discharge end, in which latter position said disk intercepts and laterally disperses the foam discharged from the tube.

5. In an apparatus for producing fire-extinguishing foam, a tube for receiving the foam and for discharging it in the form of a substantially solid stream, said tube having a main body section terminating in a foam discharge section, a deflector disk in the tube shiftable axially thereof, means for guiding said disk in its movement axially of the tube, and means without said tube operatively connected through the wall thereof to said disk and operable to shift said disk from a position within said main body section of the tube into a position external of the tube and in forwardly spaced relation with respect to the foam discharge section of the tube.

6. In an apparatus as defined in claim 5 wherein said last-mentioned means includes a slidable bolt operatively mounted upon the tube and operatively connected to said axially shiftable disk.

7. In an apparatus as defined in claim 5 wherein said disk is circular and of such diameter relatively to that of the main body section of the tube as not to materially obstruct flow of the foam through the tube when said disk is positioned within said main body section of the tube.

8. In an apparatus as defined in claim 5 wherein said disk is circular and of such diameter relatively to that of the main body section of the tube as not to materially obstruct flow of the foam through the tube when said disk is positioned within said main body section of the tube, the diameter of the disk being such as to permit of its free projection axially through the foam discharge section of the tube for interception of the foam stream as it issues from the tube.

9. In an apparatus for producing fire-extinguishing foam, a tube for receiving the foam and for discharging it in the form of a substantially solid stream, said tube having a main body section terminating in a foam discharge section of reduced internal diameter, a deflector disk in the tube shiftable axially thereof from a position to the rear of said foam discharge section to a position in advance of the same, means for guiding said disk in its movement axially of the tube, an actuating bolt shiftable longitudinally along the exterior of said tube for axially shifting said disk relatively to the tube as aforesaid, and connecting means between the bolt and the disk for transmitting the motion of said bolt to said disk.

10. In an apparatus for producing fire-extinguishing foam, a tube for receiving the foam and for discharging it in the form of a substantially solid stream, said tube having a main body section terminating in a foam discharge section of reduced internal diameter, a deflector disk in the tube shiftable axially thereof from a position to the rear of said foam discharge section to a position in advance of the same, means for guiding said disk in its movement axially of the tube, an actuating bolt slidable longitudinally along the exterior of said tube for axially shifting said disk relatively to the tube as aforesaid, and connecting means between the bolt and the disk for transmitting the motion of said bolt to said disk, said connecting means consisting of a flexible wire which extends from the bolt external of the tube through the wall of the latter to the disk within the tube.

11. In an apparatus for producing fire-extinguishing foam, a tube for receiving the foam and discharging the same in the form of a substantially solid stream, said tube having a reduced end section through which the foam discharges at high velocity, a deflector in the tube positionally adjustable axially thereof from a position to the rear of said reduced end section in which it does not impede the flow of the foam through the tube for discharge therefrom in the form of a high velocity, solid stream into a position external of said tube in forward axially spaced relation to said reduced end section to intercept said solid stream and effect dispersion of the discharged foam into the form of a widely diffused spray of reduced forward velocity, and a flexible wire which extends from said disk within said tube through the wall of the latter to the outside of the tube, said wire being axially shiftable of said tube from without the same for axially shifting said disk relatively to the tube as aforesaid.

References Cited in the file of this patent

UNITED STATES PATENTS

| Number | Name | Date |
|--------|------|------|
| 2,195,811 | Bramsen et al. | Apr. 2, 1940 |
| 2,263,104 | Riley | Nov. 18, 1941 |